United States Patent
Ito et al.

(10) Patent No.: US 7,706,532 B2
(45) Date of Patent: Apr. 27, 2010

(54) ENCRYPTION/DECRYPTION DEVICE AND METHOD

(75) Inventors: Yujiro Ito, Kanagawa (JP); Tsutomu Shimosato, Tokyo (JP); Kazunobu Tsujikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 665 days.

(21) Appl. No.: 10/564,465

(22) PCT Filed: Jul. 6, 2004

(86) PCT No.: PCT/JP2004/009907

§ 371 (c)(1),
(2), (4) Date: Jan. 12, 2006

(87) PCT Pub. No.: WO2005/010850

PCT Pub. Date: Feb. 3, 2005

(65) Prior Publication Data

US 2006/0210065 A1    Sep. 21, 2006

(30) Foreign Application Priority Data

Jul. 14, 2003 (JP) ............................. 2003-273948

(51) Int. Cl.
*H04N 7/167* (2006.01)
(52) U.S. Cl. .......................................... 380/201; 713/1
(58) Field of Classification Search ................. 380/201, 380/200, 202, 203, 204, 205, 37, 42, 28, 380/29, 30, 59; 713/210, 1, 167, 500, 502; 348/243, 51, 242
See application file for complete search history.

(56) References Cited

U.S. PATENT DOCUMENTS 4,893,339 A * 1/1990 Bright et al. ................... 380/28
5,058,157 A * 10/1991 Ryan ........................... 380/218

(Continued)

OTHER PUBLICATIONS

Jaechul Sung et al , Concrete security analysis of ctr-ofb and ctr-cfb modes of operation, 2002, springer-verlag Berlin Heidelberg, pp. 103-113.*

(Continued)

*Primary Examiner*—Matthew B Smithers
*Assistant Examiner*—Abu Sholeman
(74) *Attorney, Agent, or Firm*—Frommer Lawrence & Haug LLP; William S. Frommer; Thomas F. Presson

(57) ABSTRACT

An encryption apparatus for encrypting input picture data with high secrecy and restoration against an error of encrypted data. An EXOR circuit calculates input picture data and a pseudo random sequence and obtains encrypted data. The obtained encrypted data are held in a first FF circuit. The first FF circuit is reset for each line. Counters count for each line or each frame and are reset for each frame or at the beginning of a program. An encryption device encrypts outputs of a second FF circuit that holds a fixed value, the counters and the first FF circuit with a key and generates a pseudo random sequence. A shift register divides the bit sequence. The EXOR circuit calculates the output of the shift register and the input picture data and obtains encrypted data. Since the encrypted output is fed back, data cannot be stolen using a successive input of the same data. In addition, since an encrypted output that is fed back is reset for each line, the encrypted output can be recovered from an error.

20 Claims, 11 Drawing Sheets

U.S. PATENT DOCUMENTS

| | | | | |
|---|---|---|---|---|
| 5,345,508 | A | * | 9/1994 | Lynn et al. .................. 380/46 |
| 5,444,781 | A | * | 8/1995 | Lynn et al. .................. 380/46 |
| 5,488,659 | A | * | 1/1996 | Miliani .................. 380/212 |
| 5,588,075 | A | * | 12/1996 | Chiba et al. .................. 382/239 |
| 5,966,450 | A | * | 10/1999 | Hosford et al. .................. 380/261 |
| 6,028,932 | A | * | 2/2000 | Park .................. 380/203 |
| 6,192,078 | B1 | * | 2/2001 | Komiya et al. .................. 375/240.16 |
| 6,314,188 | B1 | * | 11/2001 | Ishibashi .................. 380/201 |
| 6,347,144 | B1 | * | 2/2002 | Park .................. 380/201 |
| 7,242,772 | B1 | * | 7/2007 | Tehranchi .................. 380/223 |
| 7,376,826 | B2 | * | 5/2008 | Tardo et al. .................. 713/151 |
| 2002/0048364 | A1 | * | 4/2002 | Gligor et al. .................. 380/37 |

OTHER PUBLICATIONS

Jaechul Sung , Concrete security analysis of CTR-OFB and CTR-CFB modes of operation. 2002, pp. 103-113, Springer-verlag Berlin Heidelberg.*

Jaechul Sung et al., Concrete Security Analysis of CTR-OFB and CTR-CFB Modes of Operation, Lecture Notes in Computer Science, vol. 2288, pp. 103 to 113, 2002 especially 3 The CTR-OFB and CRT-CFB Schemes, Appendix: The Figures of the CTR-OFB and CTR-CFB Schemes.

* cited by examiner

RELATED ART

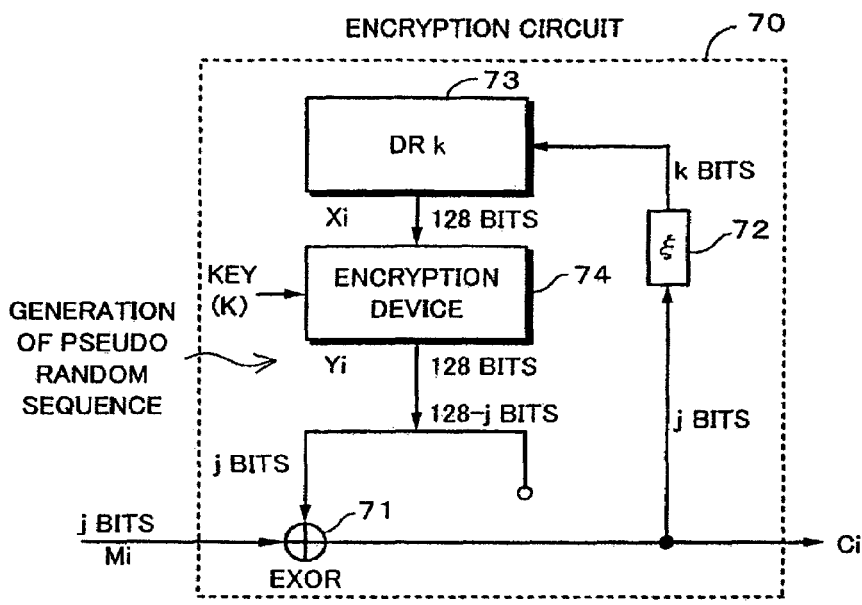
Fig. 4A GENERATION OF PSEUDO RANDOM SEQUENCE
RELATED ART
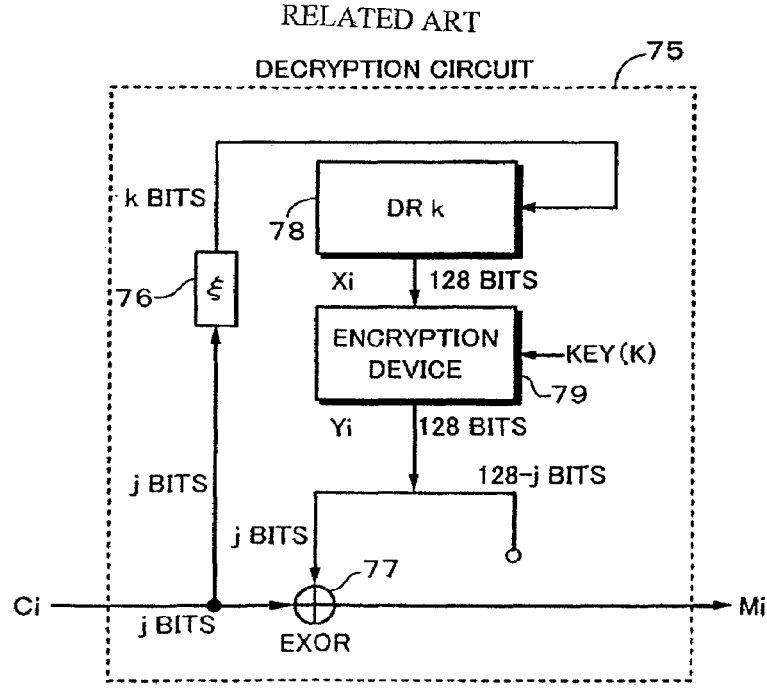
Fig. 4B
RELATED ART

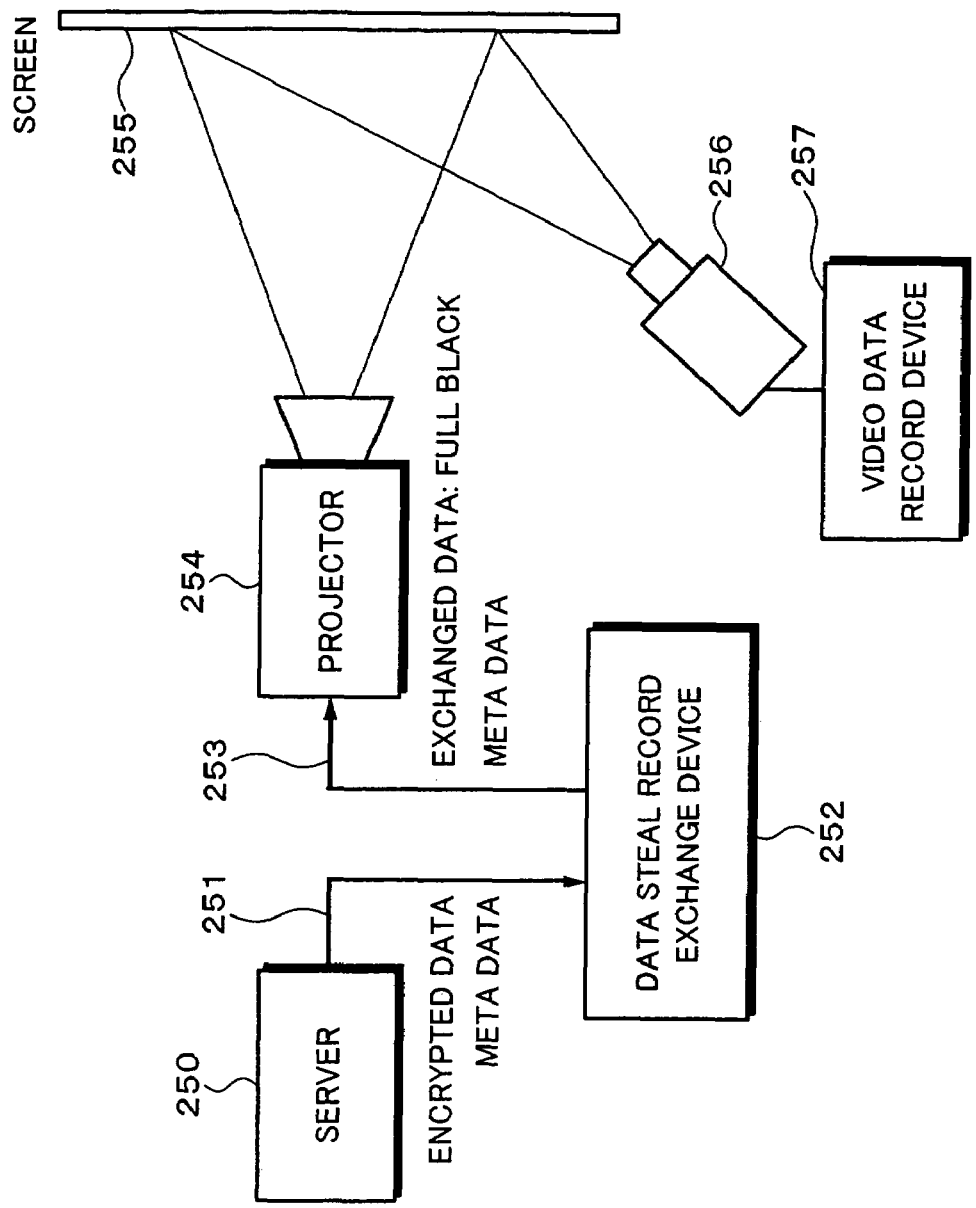

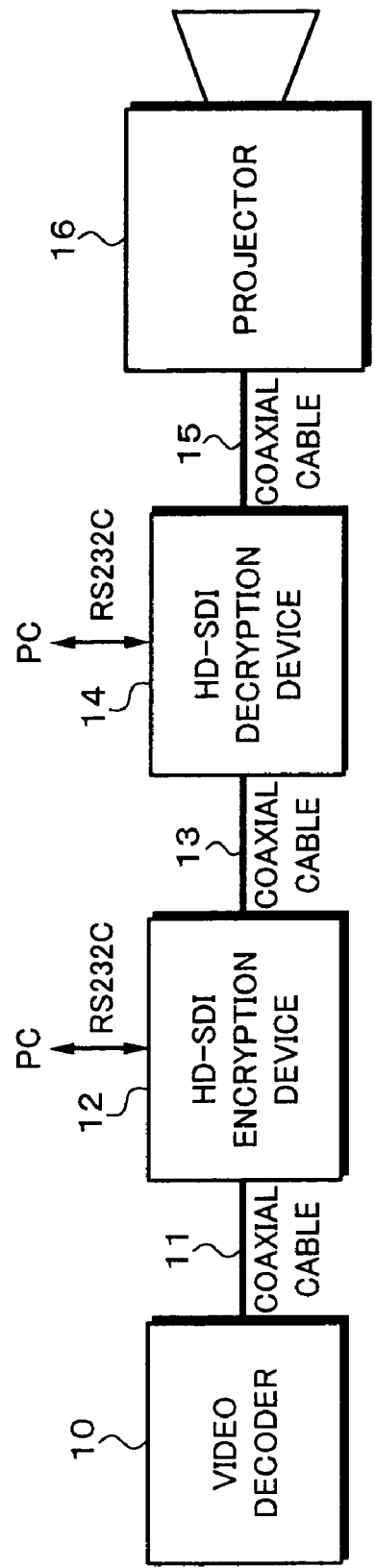

US 7,706,532 B2

ENCRYPTION/DECRYPTION DEVICE AND METHOD

TECHNICAL FIELD

The present invention relates to an encryption apparatus, an encryption method, an encryption program, a decryption apparatus, a decryption method, a decryption program, and a record medium that have high data secrecy and restoration against out-of-synchronization of data.

BACKGROUND ART

To prevent digital data from being illegally used by for example stealing or falsifying an encrypting technology that performs an encryption process for digital data to be transmitted has been practically used. FIG. 1 schematically shows an example of the structure that encrypts digital data. Original data for which an encryption program has not been yet performed are referred to as a plain text. When a plain text is encrypted by an encryption block 200, an encrypted text (encrypted data) is generated. When an encrypted text is decrypted by a decryption block 201, which corresponds to the encryption block 200, the encrypted text is restored to the plain text.

For example, AES (Advanced Encryption Standard) and DES (Data Encryption Standard) typify the encryption system used in the encryption block 200. The AES and DES encrypt a plain text and decrypt an encrypted text with an unpublished key referred to as a secret key. When the encryption block 200 encrypts a plain text according to the AES, the encryption block 200 encrypts the plain text with a key 202, which is a secret key. The encrypted text is supplied to the decryption block 201 through a transmission path. The encrypted text is decrypted with the key 202, which was used when the plain text was encrypted. The AES and DES are common key systems that use a common key for the encryption and decryption.

The encryption block 200 and the decryption block 201 are thought to use an encryption device 50 (or a decryption device) as an encryption circuit and a decryption circuit according to the AES or DES as shown in FIG. 2. The structure shown in FIG. 2 is referred to as an ECB mode (Electronic CodeBook mode). In the structure shown in FIG. 2, the encryption device 50 encrypts an input plain text Mi with a key (K) according to for example the AES and obtains an encrypted text Ci. In the same structure, when the encrypted text Ci is input to the encryption device 50 and the encrypted text Ci is encrypted with the key (K), the encrypted text Ci is decrypted and the original text Mi is obtained.

In the structure shown in FIG. 2, when the same plain text is successively input, the encrypted text having the same value is successively output. Thus, the key (K) can be easily decrypted in accordance with the plain text and encrypted text. To solve this problem, various techniques have been proposed.

In FIG. 3A and FIG. 3B, an output of the encryption device is fed back to an input thereof. This structure is referred to as a CBC (Cipher Block Chaining mode). In an encryption circuit 60 shown in FIG. 3A, a plain text Mi is input to an encryption device 62 through an EXOR (exclusive OR) circuit 61. The encryption device 62 encrypts the plain text Mi with a key (K). The encryption device 62 outputs an encrypted text Ci. A delay circuit 63 delays the encrypted text Ci by an initialized vector IV, for example one word, and supplies the delayed encrypted text to the EXOR circuit 61. The EXOR circuit 61 exclusively ORes the delayed encrypted text and the plain text Mi and outputs the resultant data to the encryption device 62.

FIG. 3B shows the structure of a decryption circuit 65, which corresponds to the encryption circuit 60. When an encrypted text Ci is decrypted, it is input to the encryption device 62. In addition, a delay circuit 67 delays the encrypted text Ci by an initialized vector IV, for example one word, and supplies the delayed encrypted text to an EXOR 68. The encryption device 62 encrypts the encrypted text Ci with the key (K). The EXOR 68 exclusively ORes the encrypted text Ci and the delayed initialized vector IV and obtains the original plain text Mi.

According to the structures shown in FIG. 3A and FIG. 3B, since the initialized vector IV is changed, even if the same key (K) is used, different encrypted texts Ci are generated with the same plain text Mi. Since the encrypted text Ci of which the plain text Mi has been encrypted is used as the initialized vector IV, even if the same plain text Mi is successively input, the encrypted texts Ci encrypted by the encryption device 62 do not become the same. Thus, in the CBC mode it is more difficult to decrypt an encrypted text than in the foregoing ECB mode.

FIG. 4A and FIG. 4B show structures of which a part of a generated encrypted text Ci is fed back to the input of an encryption device. These structures are referred to as a CFB (Cipher FeedBack mode). In an encryption circuit 70 shown in FIG. 4A, a plain text Mi that is input as j-bit data is supplied to an EXOR circuit 71. The EXOR circuit 71 exclusively ORes the bits and j bits of the output of an encryption device 74 and outputs an encrypted text Ci. The encrypted text Ci is supplied to a DR circuit 73 through a circuit 72 that converts j bits into k bits. The DR circuit 73 has a shift register that successively shifts k-bit data and generates for example 128-bit data Xi. The data Xi are supplied to the encryption device 74. The encryption device 74 encrypts the data Xi with a key (K) and obtains 128-bit data Yi. The data Yi are a pseudo random sequence. When the data Yi are exclusively ORed with the input plain text Mi, an encrypted text Ci is generated.

FIG. 4B shows the structure of a decryption circuit 75, which corresponds to the encryption circuit 70. An encrypted text Ci that has been input as j-bit data is supplied to a ξ circuit 76. The ξ circuit 76 converts j-bit data into k-bit data and supplies the k-bit data to a DR circuit 78. In addition, the encrypted text Ci is supplied to an EXOR circuit 77. The DR circuit 78 has a shift register. The shift register generates for example 128-bit data Xi from the supplied k-bit data and supplies the data Xi to an encryption device 79. The encryption device 79 encrypts the data Xi with the key (K) and obtains 128-bit data Yi. The data Yi are a pseudo random sequence. When the data Yi are exclusively ORed with the input encrypted text Ci, the encrypted text Ci is decrypted and the original plain text Mi is obtained.

The CFB mode is suitable for encrypting stream data of which an plain text Mi is successively input because the input plain text Mi and an encrypted text Ci are input to a shift register, the converted data are input to an encryption device, and the encryption device generates a pseudo random sequence. However, if a transmission error takes place in encrypted data that are output from the encryption circuit 75, until the shift register (DR circuit) completes one cycle, the encryption circuit 75 cannot be recovered from the error.

FIG. 5A and FIG. 5B show structures that feed back only an output of an encryption device and generate a pseudo random number. These structures are referred to as an OFB mode (Output FeedBack mode). In an encryption circuit 80 shown in FIG. 5A, an output of an encryption device 83 is input to the encryption device 83 through a DR circuit 82 that has a shift register. The encryption device 83 encrypts data Xi with a key (K). Data Yi that are output from the encryption device 83 are a pseudo random sequence. Only j bits of the data Yi are supplied to an EXOR circuit 81. The EXOR circuit 81 exclusively ORes the j bits of the data Yi and the plain text Mj that is input as j-bit data. As a result, the plain text Mi is encrypted and output as an encrypted text Ci.

FIG. 5B shows the structure of a decryption circuit 85, which corresponds to the encryption circuit 80. In the OFB mode, the structure of the decryption circuit 85 is the same as that of the encryption circuit 80. In other words, a j-bit encrypted text Ci is input to an EXOR circuit 86. On the other hand, an output of an encryption device 88 is input to the encryption device 88 through a DR circuit 87 that has a shift register. The encryption device 88 encrypts the output of the DR circuit 87 with the key (K). Data Yi that are output from the encryption device 88 are a pseudo random sequence. Only j bits of the data Yi are supplied to the EXOR 86. The EXOR circuit 86 exclusively ORes the j bits of the data Yi and the input encrypted text Ci, decrypts the encrypted text Ci, and obtains the plain text Mi.

In the OFB mode, since data are fed back in the encryption circuit 80 and the decryption circuit 85, they are not affected by a transmission error and so forth.

FIG. 6A and FIG. 6B show structures of which a counter successively counts up and outputs the count value to an encryption device. These structures are referred to as a counter mode. In other words, in the counter mode, a count value is encrypted and encrypted count value is used. In an encryption circuit 90 shown in FIG. 6A, a counter 92 counts up and outputs a count value Xi as 128-bit data to an encryption device 93. The encryption device 93 encrypts the count value Xi with a key (K). The encryption device 93 outputs data Yi that are a pseudo random sequence. Only j bits of the data Yi are supplied to an EXOR circuit 91. The EXOR circuit 91 exclusively ORes the j bits of the data Yi and the j-bit plain text Mi and generates an encrypted text Ci.

FIG. 6B shows the structure of a decryption circuit 95, which corresponds to the encryption circuit 90. In the counter mode, the structure of the decryption circuit 95 is the same as that of the encryption circuit 90. In other words, a counter 97 successively counts up and outputs a count value Xi to an encryption device 98. The encryption device 98 encrypts the count value Xi with the key (K). Data Yi that are output from the encryption device 98 are a pseudo random sequence. Only j bits of the data Yi are supplied to an EXOR circuit 96. The EXOR circuit 96 exclusively ORes the j bits of the data Y1 and the j-bit encrypted text Ci, decrypts the encrypted text Ci, and obtains a plain text Mi.

As described above, in the CFB mode, the OFB mode, and the counter mode, an encrypted text Ci is decrypted by exclusively ORing the same pseudo random number with which the encrypted text Ci was encrypted and the encrypted text Ci. A non-patent document, "Basic Encryption Theory (translated title)", Douglas R. Stinson, Kohichi Sakurai; Kyoritsu Publishing Company, 1996, describes the foregoing various encryption systems.

In recent years, a digital cinema system has been proposed for movie theaters. In the digital cinema system, picture data as movies are stored in for example a picture server. Picture data are reproduced from the picture server and projected on a screen of a movie theater. According to this system, picture data distributed through for example a network and picture data that are recorded on a record medium such as a large capacity optical disc are supplied to the picture server. The picture data are transmitted form the picture server to a projector through for example a coaxial cable and a picture corresponding to the picture data is projected by the projector to the screen.

Picture data are transmitted as serial digital data according to for example the HD-SDI (High Definition-Serial Data Interface) transmission format from the picture server to the projector. The picture data are transmitted as baseband picture data. The transmission rate of the picture data is for example around 1.5 Gbps (Giga bits per second).

At this point, to prevent picture data from being stolen, the picture data that are output from the picture server are encrypted and the encrypted picture data are transmitted to the projector through for example a coaxial cable. If codes transmitted according to the HD-SDI format are not restricted, HD-SDI encryption/decryption systems according to the foregoing encryption systems can be accomplished. In other words, an encryption circuit is disposed on the picture server side to encrypt output picture data. On the other hand, a decryption circuit corresponding to the encryption circuit is disposed on the projector side. Picture data encrypted by the picture server are transmitted according to the HD-SDI format to the projector through the coaxial cable. The encrypted picture data are decrypted by the decryption circuit on the projector side and restored to baseband picture data.

However, actually, in the HD-SDI, prohibition codes for word synchronization are defined. Thus, the applicant of the present patent application has filed a system that encrypts picture data without generating prohibition codes as Japanese Patent Application No. 2002-135039. In addition, the applicant has filed the related patent applications as Japanese Patent Application Nos. 2002-135079, 2002-135092, 2002-173523, and 2002-349373.

In recent years, HD-SDI picture data encryption/decryption systems have been standardized. As an encryption system, the counter mode described in FIG. 6A and FIG. 6B has been proposed. According to the proposition, 128-bit data as an encryption unit are dividedly used and divided bits are counted by the following three types of counters.

(1) Clock counter that counts up for each clock of the encryption device,
(2) Line counter that counts up for each line of picture data.
(3) Frame counter that counts up for each frame of picture data.

Among these three types of counters, the (1) clock counter is reset for each line that is updated, the (2) line counter is reset for each frame that is updated, and the (3) frame counter is reset when one program of picture data is started. With a combination of a plurality of counters that differ in count periods and reset timings, even if out-of-synchronization takes place or data are lost in a data transmission system, data that are lost, namely data that cannot be decrypted, are as low as data of one line.

In addition, even if the (1) clock counter and the (2) line counter are reset, since the value of the (3) frame counter is updated, the same pseudo random sequence is not repeated.

On the other hand, when the CFB mode described in FIG. 4A and FIG. 4B is used, if a counter were reset at a particular time after startup of a program and then the counter were not reset, it would become very difficult to recover the encryption/decryption circuits from an undesirable event such as the foregoing out-of-synchronization and missing of data. In other words, in the CFB mode, data of which an output of an encryption circuit is successively shifted by a shift register is encrypted by an encryption device with a key (K) and a plain text Mi is encrypted with an output of the encryption device. Thus, if an error takes place while data are being encrypted, until the error does not affect the shift register, data that can be decrypted would not be output. In other words, in the CFB mode, since an encrypted text Ci that is output depends on all the past encrypted text Ci, the encrypted data cannot be decrypted in a short time.

Of course, in the CFB mode, an input of an encryption device can be reset for each frame and/or each line. However, if an input of the encryption device were reset for each frame and/or each line and the input data were full black for a plurality of frames, a pseudo random sequence that is output from the encryption device becomes the same in each frame. This pseudo random sequence conveys a hint to a person who tries to steal picture data transmitted from the picture server and the projector. Thus, such a situation is undesirable on security of encrypted data.

Next, a method of stealing picture data from the foregoing digital cinema system will be described. FIG. 7 schematically shows an example of a system that accomplishes stealing of picture data. Picture data are reproduced and encrypted by a picture server 250. The encrypted picture data are sent as encrypted data to a coaxial cable 251. The encryption system resets a counter for each line and for each frame of picture data, and at the beginning of a program according to the foregoing counter mode to recover the system from a transmission error. A projector 254 side normally receives data from the projector 254 through the coaxial cable 251, decrypts encrypted picture data, and projects the decrypted picture data as baseband picture data to a screen 255.

A stealer of picture data prepares a data steal record/exchange device 252, a video camera 256, and a video data record device 257. The data steal record/exchange device 252 is interposed between the picture server 250 and the projector 254. For example, as shown in FIG. 7, the coaxial cable 251 that has to be connected between the server 250 and the projector 254 is connected to the data steal record/exchange device 252. An output of the data steal record/exchange device 252 is sent to the projector 254 through a coaxial cable 253. The video camera 256 is disposed so as to capture a picture projected on the screen 255. The picture captured by the video camera 256 is supplied to the video data record device 257 and recorded on a record medium such as an optical disc or a magnetic tape.

In such a structure, the stealer operates the data steal record/exchange device 252 to record encrypted data that are output from the encrypted picture server 250 and meta data accompanied by the picture data. The data steal record/exchange device 252 outputs predetermined data instead of encrypted data supplied from the picture server 250 along with the meta data accompanied by the encrypted data. At this point, the stealer does not change the meta data. The predetermined data that the data steal record/exchange device 252 provides is a fixed value that causes a black screen to appear.

The predetermined data and the meta data that are output from the data steal record/exchange device 252 are supplied to the projector 254. The projector 254 decrypts the supplied predetermined data. In other words, if the predetermined data are fixed data that cause a black screen to spear, the predetermined data and a pseudo random number of the decryption circuit are exclusively ORed. Picture data of which the predetermined data and the pseudo random number have been exclusively ORed are projected on the screen 255.

A picture projected on the screen 255 depends on data of which predetermined data for example a fixed value and a pseudo random number of the encryption circuit are calculated. Thus, the picture that is projected on the screen 255 is completely different from the original picture data that are output from the picture server 250. The picture projected on the screen 255 appears as noise. The stealer operates the video camera 256 to capture a picture of the predetermined data projected on the screen 255 and the video data record device 257 to record the picture. With the encrypted data recorded by the data steal record/exchange device 252 and the picture data recorded by the video data record device 257, the original picture data that have not been encrypted can be restored.

In other words, if the projecting performance of the projector 254 and the capturing performance of the video camera 256 were ideal and the encrypted data and the picture data were exclusively ORed, the original picture data of the encrypted data could be restored as a disadvantage of the related art.

In reality, the projector 254 and the video camera 256 that have ideal performances do not exist. Thus, in the foregoing method, the original picture data cannot be accurately restored. However, with imperfect data, when the foregoing calculation is preformed, the original picture data can be reproduced with high probability.

It is known that a particular pixel and the adjacent pixels have high correlation as a property of picture data. With the correlation of adjacent pixels, under such circumstances, the values of pixels that are not accurately reproduced can be obtained. As a result, pseudo random numbers with which the pixels (picture data) have been encrypted can be narrowed down. As a result, the stealer may obtain a hint about decrypting a key (K) with which picture data have been encrypted as a disadvantage of the related art.

On the other hand, if the CFB mode is used to encrypt picture data that are output from the picture server 250, since input data are encrypted by feeding back the encrypted data, even if the same data are successively input, a pseudo random sequence that is output varies. Thus, it is difficult to obtain a hint of a key (K). However, as described above, the CFB mode is weak in recovering the system from a transmission error as a disadvantage thereof. This disadvantage may cause a serious problem when picture data are played in a movie theater.

DISCLOSURE OF THE INVENTION

Thus, an object of the present invention is to provide an encryption apparatus, an encryption method, an encryption program, a decryption apparatus, a decryption method, a decryption program, and a record medium that allow data to be encrypted with higher secrecy and recovery from a transmission error than the related art.

To solve the foregoing problem, the present invention is an encryption apparatus, comprising hold means for holding a part or all input data with a trigger signal and resetting the held data with a reset signal; one or a plurality of counters that count up or count down the count values with the trigger signal and reset the count values to predetermined values with the reset signal; encryption means for encrypting the data held by the hold means and one or a plurality of count values of the one or plurality of counters; calculation means for calculating the output of the encryption means and input data that are input from the outside according to a predetermined rule, encrypting the input data, and outputting the encrypted data; a path that inputs a part or all the encrypted data that are output from the calculation means to the hold means; and signal generation means for generating the trigger signal and the reset signal supplied to the hold means and the one or plurality of counters according to a predetermined rule and/or at predetermined timing.

The present invention is an encryption method, comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are output at the calculation step to the hold step; and generating the trigger signal and the reset signal supplied to the hold step and the count step according to a predetermined rule and/or at predetermined timing.

The present invention is an encryption program that causes a computer device to execute an encryption method, the encryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are output at the calculation step to the hold step; and generating the trigger signal and the reset signal supplied to the hold step and the count step according to a predetermined rule and/or at predetermined timing.

The present invention is a record medium from which a computer device can read an encryption program that causes the computer device to execute an encryption method, the encryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are output at the calculation step to the hold step; and generating the trigger signal and the reset signal supplied to the hold step and the count step according to a predetermined rule and/or at predetermined timing.

The present invention is a decryption apparatus that decrypts encrypted data encrypted by an encryption apparatus that comprises hold means for holding a part or all input data with a trigger signal and resetting the held data with a reset signal; one or a plurality of counters that count up or count down the count values with the trigger signal and reset the count values to predetermined values with the reset signal; encryption means for encrypting the data held by the hold means and one or a plurality of count values of the one or plurality of counters; calculation means for calculating the output of the encryption means and input data that are input from the outside according to a predetermined rule, encrypting the input data, and outputting the encrypted data; a path that inputs a part or all the encrypted data that are output from the calculation means to the hold means; and signal generation means for generating the trigger signal and the reset signal supplied to the hold means and the one or plurality of counters according to a predetermined rule and/or at predetermined timing, the decryption apparatus comprising hold means for holding a part or all input data with a trigger signal and resetting the held data with a reset signal; one or a plurality of counters that count up or count down the count values with the trigger signal and reset the count values to predetermined values with the reset signal; encryption means for encrypting the data held by the hold means and one or a plurality of count values of the one or plurality of counters; calculation means for calculating the output of the encryption means and input data that are input from the outside according to a predetermined rule, encrypting the input data, and outputting the encrypted data; a path that inputs a part or all the encrypted data that are input from the outside to the hold means; and signal generation means for generating the trigger signal and the reset signal supplied to the hold means and the one or plurality of counters according to a predetermined rule and/or at predetermined timing.

The present invention is a decryption method of decrypting encrypted data encrypted in an encryption method, the encryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are output at the calculation step to the hold step; and generating the trigger signal and the reset signal supplied to the hold step and the count step according to a predetermined rule and/or at predetermined timing, the decryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are input from the outside to the hold step; and generating the trigger signal and the reset signal supplied to the hold step and the count step according to a predetermined rule and/or at predetermined timing.

The present invention is a decryption program that causes a computer device to execute a decryption method of decrypting encrypted data encrypted in an encryption method, the encryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are output at the calculation step to the hold step; and generating the trigger signal and the reset signal supplied to the hold step and the count step according to a predetermined rule and/or at predetermined timing, the decryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are input from the outside to the hold step; and generating the trigger signal and the reset signal supplied to the hold step and the count step according to a predetermined rule and/or at predetermined timing.

The present invention is a record medium from which a computer device can read a decryption program that causes the computer device to execute a decryption method of decrypting encrypted data encrypted in an encryption method, the encryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are output at the calculation step to the hold step; and generating the trigger signal and the reset signal supplied to the hold step and the count step according to a predetermined rule and/or at predetermined timing, the decryption method comprising the steps of holding a part or all input data with a trigger signal and resetting the held data with a reset signal; counting up or down the count values with the trigger signal and resetting the count values to predetermined values with the reset signal; encrypting the data held at the hold step and one or a plurality of count values at the count step; calculating the output at the encryption step and input data that are input from the outside according to a predetermined rule, encrypting the input data, and outputting the encrypted data; inputting a part or all the encrypted data that are input from the outside to the hold step; and generating the trigger signal and the reset signal supplied to the hold step and the count step according to a predetermined rule and/or at predetermined timing.

As described above, a part or all final encrypted data are held with a trigger signal and the held data are reset with a reset signal. The count values are counted up and down with the trigger signal and the count values are reset to predetermined values with the reset signal. The held data and one or a plurality of count values are encrypted. The encrypted output and input data that are input from the outside are calculated according to a predetermined rule. The input data are encrypted. The final encrypted data are output. The final encrypted data are fed back to data that are encrypted. An output of encrypted data used to calculate the encrypted data is reset with the reset signal. Thus, data cannot be stolen by using the same data that are successively input. In addition, the system can be recovered from a transmission error of encrypted data.

According to the present invention, an encryption circuit uses the CFB mode. When video data are encrypted, encrypted data are fed back to an input of an encryption device. Thus, even if encrypted picture data are tried to be stolen and decrypted in the data steal method of the related art shown in FIG. 7, the original picture data cannot be restored at all as an effect of the present invention. As a characteristic of the CFB mode, since a pseudo random sequence generated by the encryption device is affected by an input data sequence, the pseudo random sequence obtained in the steal method of the related art is completely different from the pseudo random sequence generated by the encryption device of the encryption circuit.

In addition, according to the present invention, when encrypted data are fed back to the input of the encryption device, the encrypted data to be fed back are held and the held encrypted data are reset for each line. Thus, the system is not affected by feedback of encrypted data of the preceding line. Thus, even if an undesirable event such as out-of-synchronization or missing of a pixel takes place in the preceding line, when the current line is updated, the system can be completely recovered from such an error.

BRIEF DESCRIPTION OF DRAWINGS

FIG. 4A and FIG. 4B are block diagrams showing an example of structure of an encryption circuit according to the CFB mode;

FIG. 7 is a block diagram schematically showing an example of a system that accomplishes stealing of picture data;

FIG. 8 is a block diagram schematically showing an example of the structure of a picture projection system according to an embodiment of the present invention;

BEST MODES FOR CARRYING OUT THE INVENTION

Figure 1:
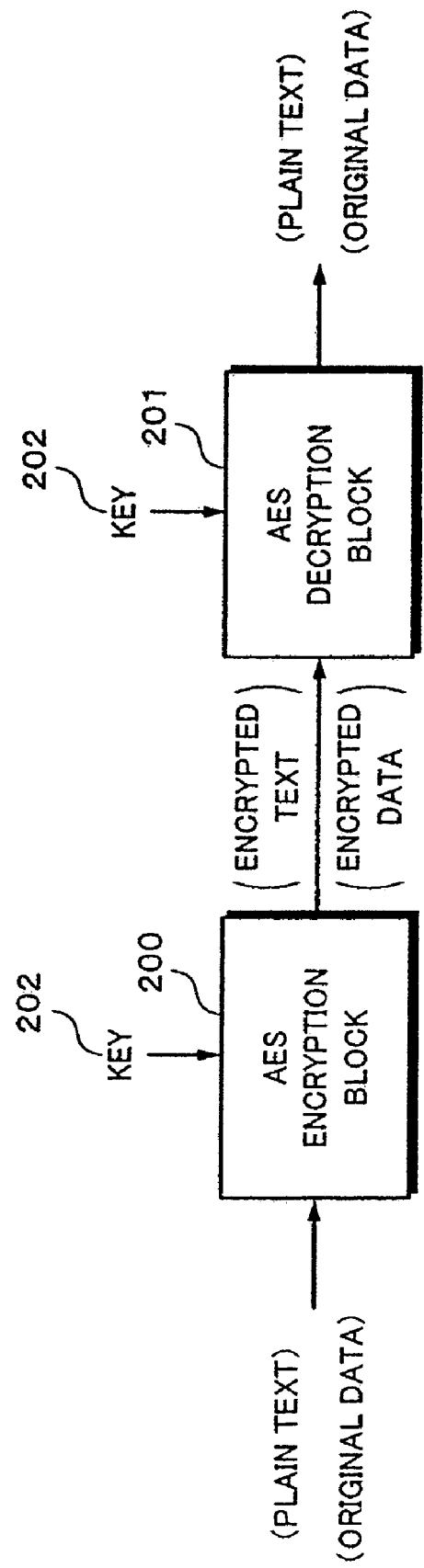
FIG. 1 is a block diagram schematically showing an example of a structure that encrypts digital data.
Figure 2:
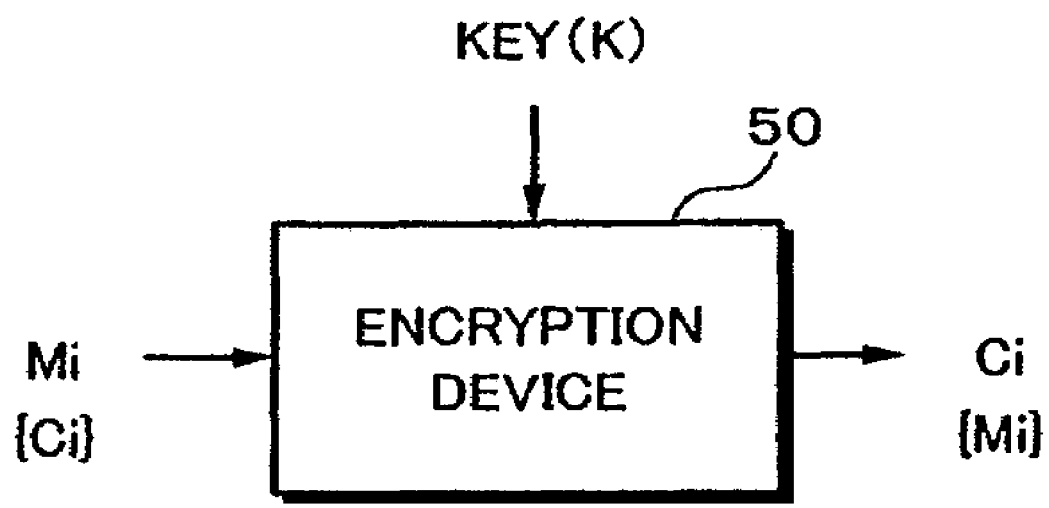
FIG. 2 is a block diagram showing an example of the structure of an encryption circuit according to the ECB mode.
Figure 3A:
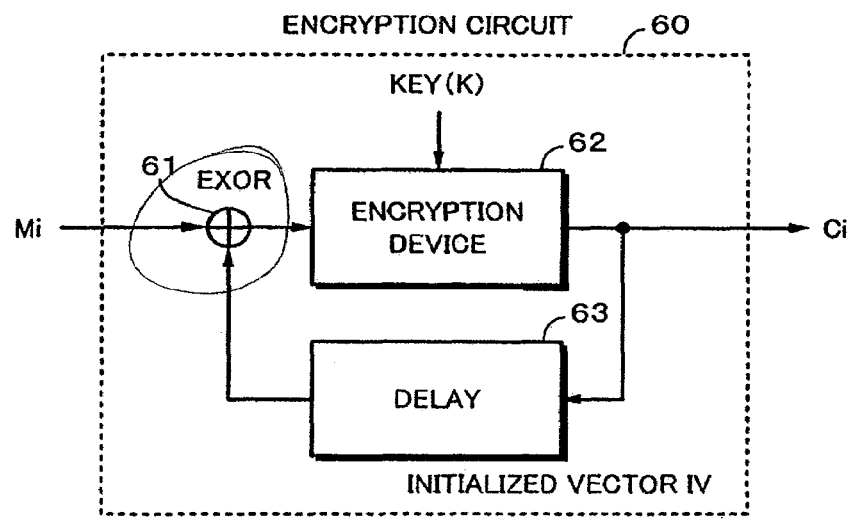
FIG. 3A and FIG. 3B are block diagrams showing an example of the structure of an encryption circuit according to the CBC mode.
Figure 3B:
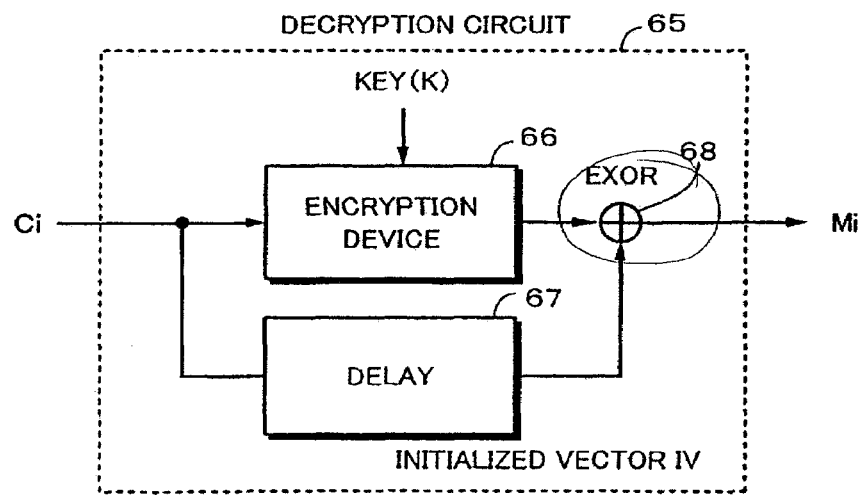
Figure 5A:
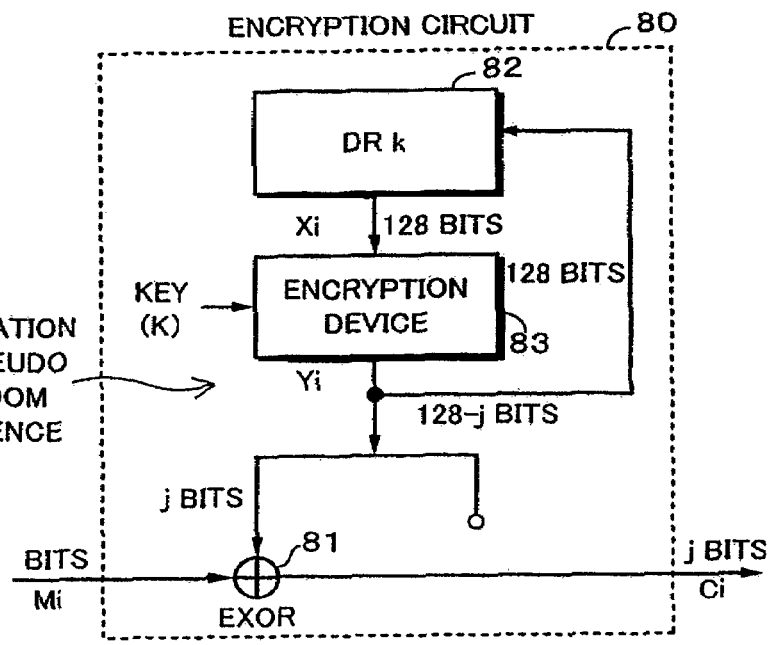
FIG. 5A and FIG. 5B are block diagrams showing an example of the structure of an encryption circuit according to the OFB mode.
Figure 5B:
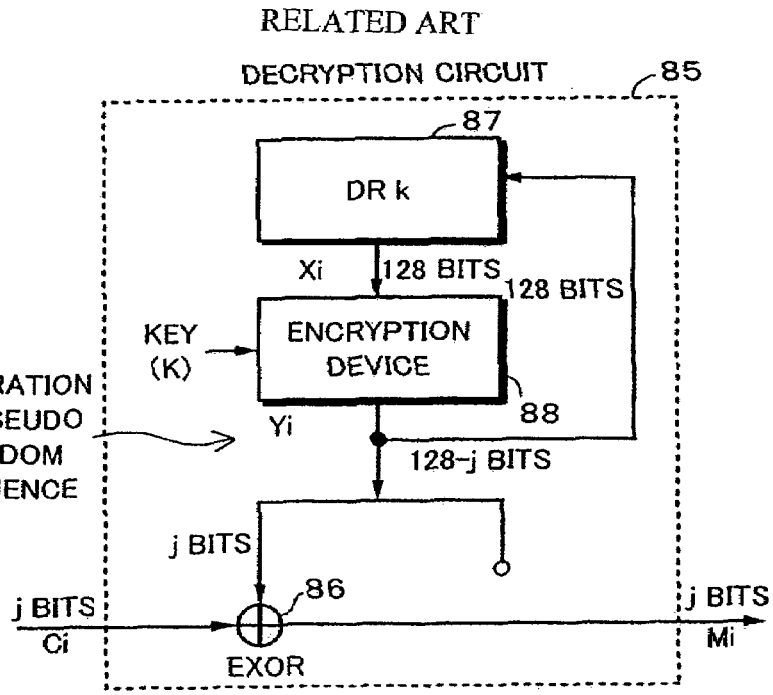
Figure 6A:
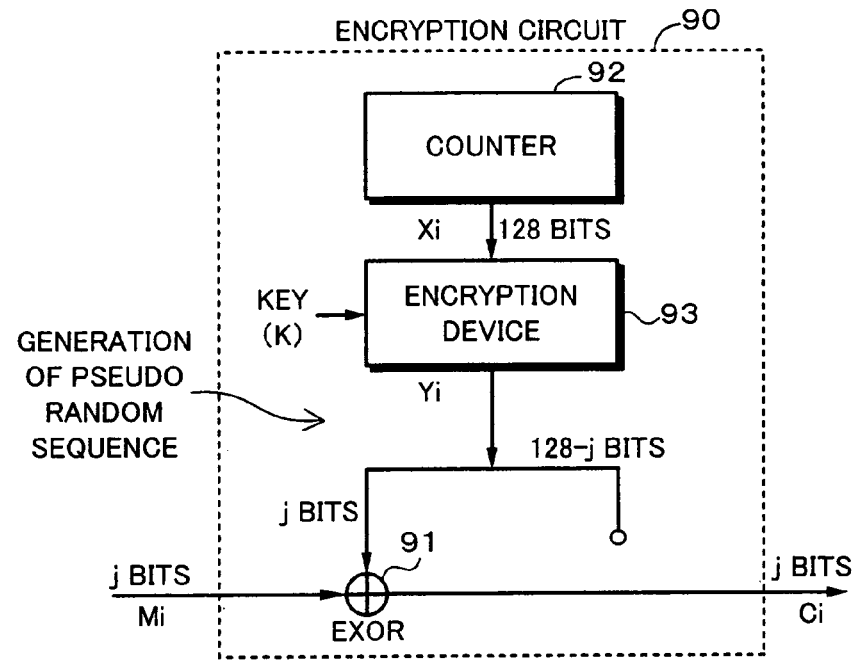
FIG. 6A and FIG. 6B are block diagrams showing an example of the structure of an encryption circuit according to the counter mode.
Figure 6B:
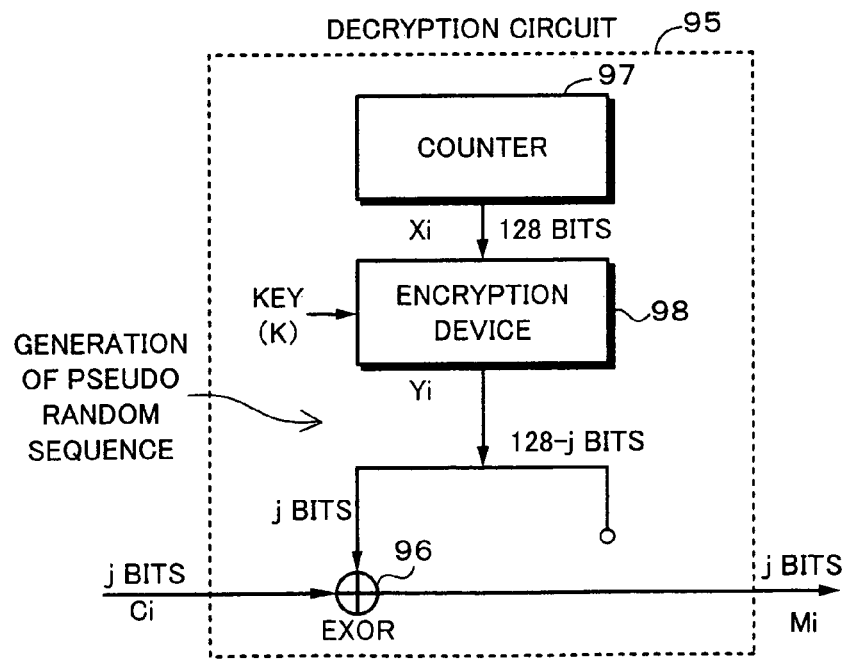

Next, with reference to the accompanying drawings, embodiments of the present invention will be described. FIG. 8 schematically shows an example of the structure of a picture projection system according to an embodiment of the present invention. The picture projection system is suitably used to play picture data provided as digital data in a movie theater or the like. A video decoder 10 decodes picture data that have been compression encoded and supplied from a picture server (not shown) through a network or the like and obtains baseband video data. The video data are output in for example the HD-SDI format as serial digital data at a transmission rate of around 1.5 Gbps.

The video decoder 10 may reproduce picture data, which have been compression encoded, from a record medium such as a large capacity optical disc, decode the encoded picture data, and output the reproduced picture data.

Data that are output from the video decoder 10 are supplied to an HD-SDI encryption device 12 through a coaxial cable 11. The HD-SDI encryption device 12 extracts picture data from the supplied data, encrypts the extracted picture data, and outputs the encrypted video data according to the HD-SDI format. An encryption key (K) is supplied from for example a computer device (PC) connected through an interface such as RS232C. Data that are output from the HD-SDI encryption device 12 are sent to a projector 16 side through a coaxial cable 13 and then supplied to an HD-SDI decryption device 14.

The HD-SDI decryption device 14 extracts the encrypted video data from the HD-SDI format digital data, decrypts the encrypted video data, and restores the original baseband video data. A decryption key (K) is in common with the encryption key (K) used in the HD-SDI encryption device 12 and supplied from a computer device connected through an interface such as RS-232C.

The baseband video data that are restored by the HD-SDI decryption device 14 are supplied to the projector 16 through a coaxial cable 15. The projector 16 projects the video data on a screen (not shown).

In the foregoing description, the video decoder 10 and the HD-SDI encryption device 12 are described as different devices. In reality, the HD-SDI encryption device 12 is disposed in the video decoder 10. In this case, the coaxial cable 11, which connects the video decoder 10 and the HD-SDI encryption device 12, can be omitted. In addition, video data that are output from the video decoder 10 can be handled as for example parallel digital data, not HD-SDI format video data. Likewise, the HD-SDI decryption device 14 is disposed in the projector 16. In this case, likewise, the coaxial cable 15 can be omitted. In addition, video data can be output as parallel digital data from the HD-SDI decryption device 14.

Figure 9:
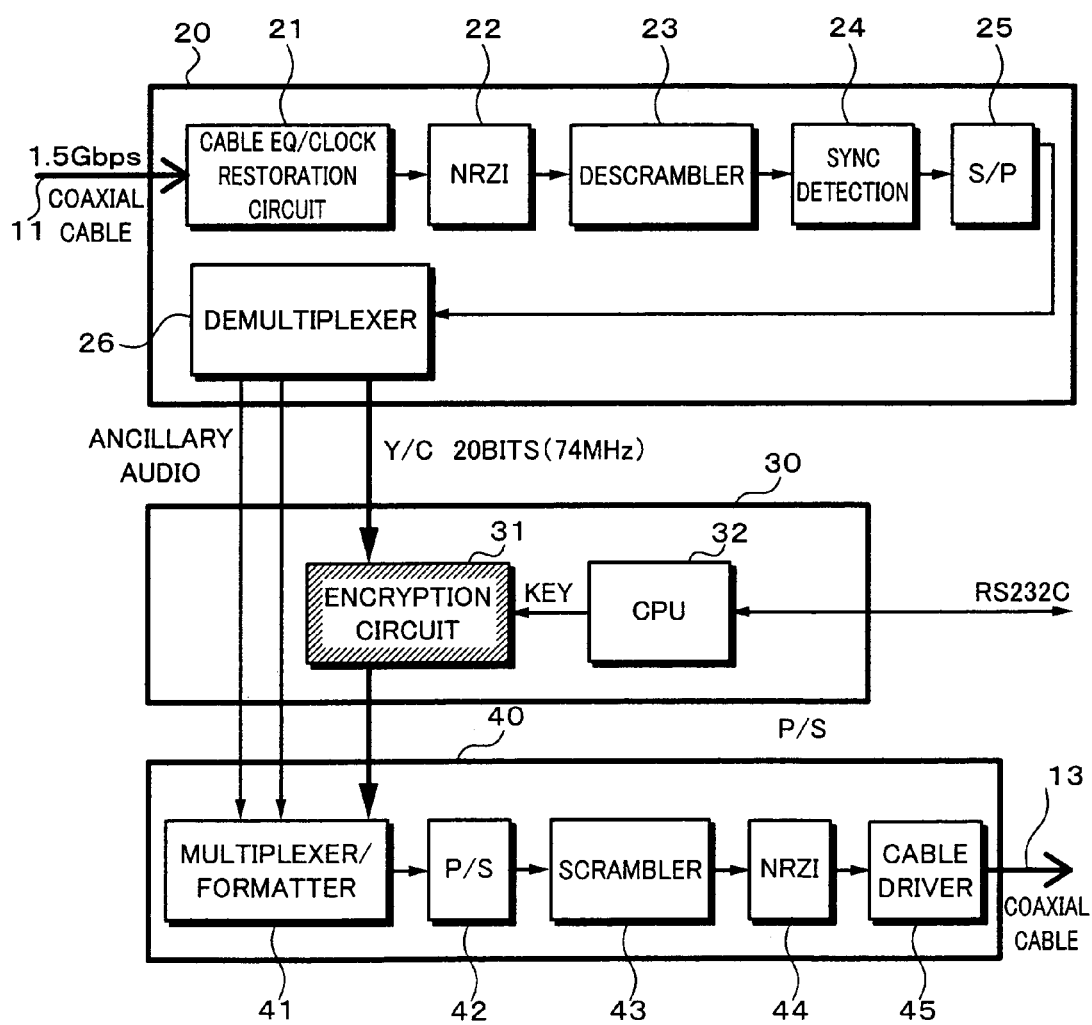
FIG. 9 is a block diagram showing an example of the structure of an HD-SDI encryption device.

FIG. 9 shows an example of the structure of the HD-SDI encryption device 12. The HD-SDI encryption device 12 is mainly composed of an HD-SDI serial/parallel conversion circuit block 20, an encryption circuit block 30, and an HD-SDI parallel/serial conversion circuit block 40.

Digital data transmitted according to the HD-SDI format through the coaxial cable 11 are supplied to the HD-SDI serial/parallel conversion circuit block 20. The HD-SDI serial/parallel conversion circuit block 20 converts the serial digital serial data into parallel digital data and extracts video data, audio data, and meta data from the parallel digital data. The audio data and meta data are supplied to the HD-SDI parallel/serial conversion circuit block 40. The video data are encrypted by the encryption circuit block 30 and supplied to the HD-SDI parallel/serial conversion circuit block 40. The HD-SDI parallel/serial conversion circuit block 40 superimposes the audio data, meta data, and encrypted video data, converts them into serial digital data based on the HD-SDI format, and outputs the serial digital data.

In the HD-SDI serial/parallel conversion circuit block 20, a cable equalizer (EQ)/clock restoration circuit 21 compensates the frequency characteristic of the HD-SDI format serial digital data deteriorated through the coaxial cable 11 and extracts a clock from the serial digital data. The directivity of the signal of the digital data is removed by encoding the digital data according to the NRZI so that the digital data can be received even if the received signal is inverted. The digital data that are output from the cable equalizer/clock restoration circuit 21 are supplied to an NRZI circuit 22. The NRZI circuit 22 decodes NRZI codes of the digital data, which have been added when the digital data have been transmitted. An output of the NRZI circuit 22 is supplied to a descrambler 23. The descrambler 23 cancels a scramble process. The scramble process removes DC components from data that are transmitted. A sync detection circuit 24 detects word synchronization. According to the detected word synchronization, a serial/parallel conversion circuit 25 converts the serial digital data into parallel digital data.

An output of the serial/parallel conversion circuit 25 is supplied to a demultiplexer 26. The demultiplexer 26 demultiplexes the parallel digital data and separates them into video data, audio data, meta data, and so forth. The audio data and meta data separated by the demultiplexet 26 are supplied to a multiplexer/formatter 41 of the HD-SDI parallel/serial conversion circuit block 40.

On the other hand, the video data separated by the demultiplexer 26 are supplied to the encryption circuit block 30. An encryption circuit 31 encrypts the video data. The encryption circuit block 30 has a CPU (Central Processing Unit) 32. The encryption circuit block 30 can communicate with an external computer device through a predetermined interface such as RS-232C. Instead, the encryption circuit block 30 may be composed of a computer device that performs an encryption process according to an encryption program that is recorded on a predetermined record medium and provided therewith. The encryption key (K) used in the encryption circuit 31 is supplied from the external computer device through the predetermined interface and supplied to the encryption circuit 31 through the CPU 32. The encrypted video data encrypted by the encryption circuit 31 are supplied to the multiplexer/formatter 41 of the HD-SDI parallel/serial conversion circuit block 40.

In the HD-SDI parallel/serial conversion circuit block 40, the multiplexer/formatter 41 multiplexes the supplied audio data, meta data, and encrypted video data and maps them in the HD-SDI format. An output of the multiplexer/formatter 41 is converted into serial digital data by a parallel/serial conversion circuit 42. A scrambler 43 performs a scramble process that removes DC components from the serial digital data. An NRZI circuit 44 encodes the scrambled data according to NRZI. An output of the NRZI circuit 44 is amplified to a transmission level by a cable driver 45 and sent to the coaxial cable 13.

The HD-SDI decryption device 14 has a circuit that is the same as the HD-SDI serial/parallel conversion circuit block 20 of the HD-SDI encryption device 12 (this circuit is referred to as the HD-SDI serial/parallel conversion circuit block 20') and a decryption circuit block, which corresponds to the encryption circuit block 30. The decryption circuit may be composed of a computer to perform a decryption process according to a decryption program recorded on a predetermined record medium. The HD-SDI format digital data supplied through the coaxial cable 13 is processed by the HD-SDI serial/parallel conversion circuit block 20' in the same manner as the HD-SDI serial/parallel conversion circuit block 20 and extracts encrypted video data, audio data, and meta data from the digital data. The encrypted video data are supplied to the decryption circuit block. The decryption circuit block decrypts the encrypted video data with the decryption key (K) supplied from the external computer device and restores baseband video data. Among the restored data, video data and meta data are supplied to the projector 16 and the audio data to an audio system (not shown).

Figure 10:
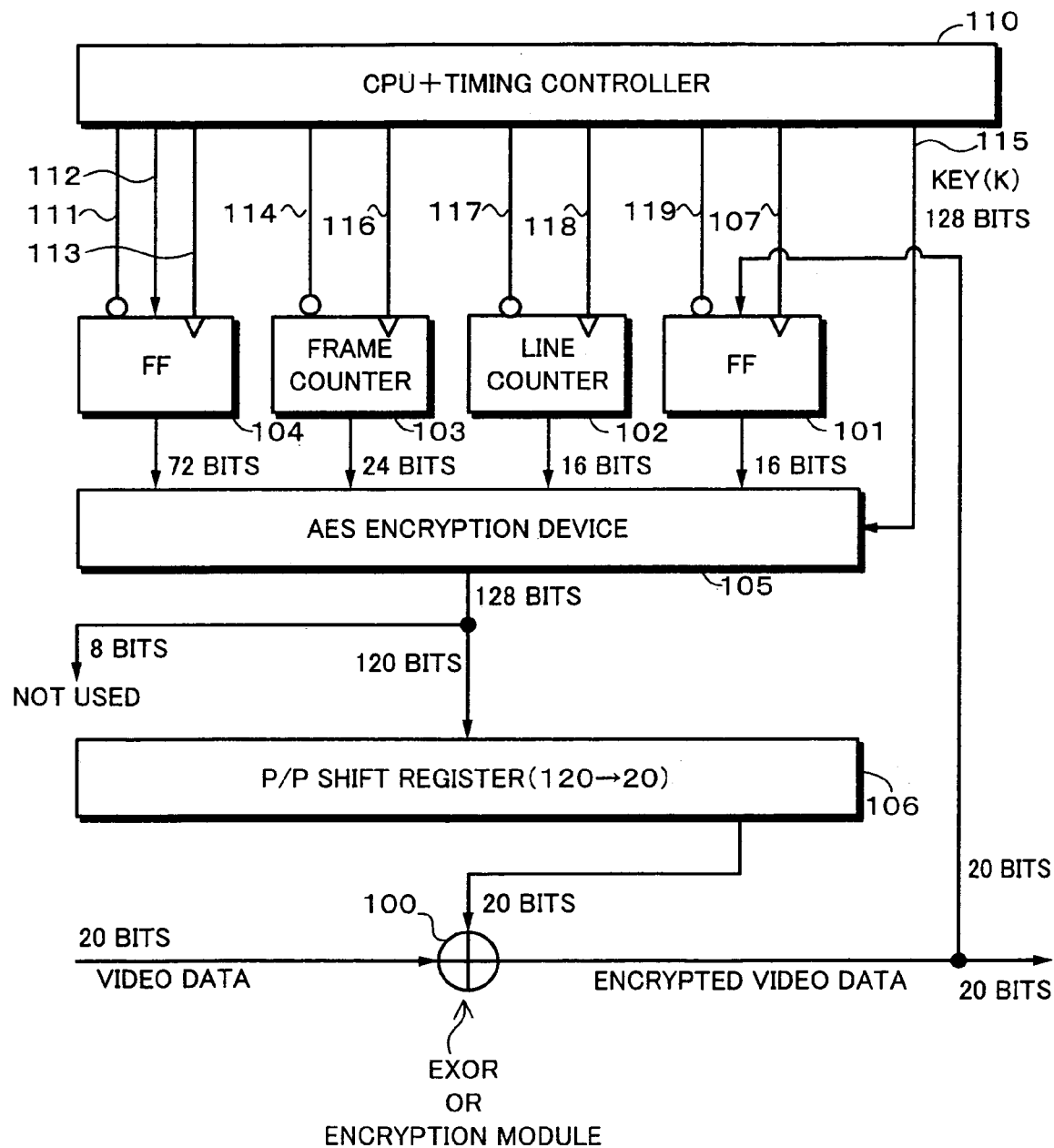
FIG. 10 is a block diagram showing an example of the structure of an encryption circuit according to an embodiment of the present invention.

FIG. 10 shows an example of the structure of the encryption circuit 31 according to an embodiment of the present invention. The encryption circuit 31 according to the embodiment of the present invention accomplishes a structure that provides recovery from a data error according to the counter mode and durability against stealing of data according to the CFB mode.

An encryption device 105 is an AES encryption device that encrypts data according to the AES with a 128-bit key (K). An encryption system that the encryption device 105 can use is not limited to the AES. As long as data such as DES are block-segmented and encrypted, another encryption system may be used. In addition, the data length of the key (K) is not limited to 128 bits.

A CPU+timing controller 110 is composed of the CPU 32 shown in FIG. 9 and a timing controller (not shown). The timing controller can output various signals at timing of each clock and each frame and each line of video data.

Video data composed of 10 bits of luminance Y and 10 bits of color difference C, a total of 20 bits for each pixel are input to the encryption circuit 31 for each clock. The video data are supplied to an EXOR circuit 100. The EXOR circuit 100 exclusively ORes the video data and an output of a P/P shift register 106 (that will be described later) and outputs the calculated data as encrypted video data.

The encrypted video data that are output from the EXOR circuit 100 are output to the outside, namely, the HD-SDI parallel/serial conversion circuit block 40. In addition, the encrypted video data are supplied to a flip-flop (FF) circuit 101. The FF circuit 101 holds the encrypted video data. The FF circuit 101 updates the hold value with the same clock 107 as the AES encryption device 105. A reset signal 119 is supplied from the CPU+timing controller 110 to the FF circuit 101 so that the FF circuit 101 is reset a predetermined number of times for each line of the video data. The number of times of the reset signal 119 corresponds to AES latency of which for example a reset value of the AES encryption device 105 affects the output thereof.

According to the embodiment, a part of 20-bit encrypted video data, for example only 16 bits thereof, is input to the FF circuit 101. The 16 bits may be on the LSB side or MSB side of the 20-bit original encrypted video data. Instead, predetermined 16 bits may be selected from the 20 bits. The present invention is not limited to these examples. Instead, all the 20-bit encrypted video data may be input to the FF circuit 101. Instead, bits smaller than 16 bits may be input.

A line counter 102 is a counter that updates the count value with a trigger signal 118 supplied from the CPU+timing controller 110 for each line of video data. For example, the line counter 102 counts up by one for each line of video data. A reset signal 117 is supplied from the CPU+timing controller 110 to the line counter 102 so that the line counter 102 is reset for each frame that is updated. The line count value is for example 16-bit data.

Instead, the count value of the line counter 102 may be updated for every a plurality of lines. Instead, the count value may be updated by a predetermined value that is for example 2 or more at a time, not by one at a time. Instead, the line counter 102 may count down from a predetermined value. When the line counter 102 is reset with the reset signal 117, the count value may be reset to 0 or any other value. In addition, the data length of the line count value is not limited to 16 bits.

A frame counter 103 is a counter whose count value is updated with a trigger signal 116 supplied for each frame of video data supplied from the CPU+timing controller 110. The frame counter 103 counts up by 1 for each frame of video data. A reset signal 114 is supplied from the CPU+timing controller 110 to the frame counter 103 so that the frame counter 103 is reset when for example a program of video data is started. The frame count value is for example 24-bit data.

Instead, the count value of the frame counter 103 may be updated by a predetermined value that is 2 or more. Instead, the count value of the frame counter 103 may count down from a predetermined value. In addition, the frame counter 103 may be reset to 0 with the reset signal 117. Instead, the frame counter 103 may be reset to a predetermined value other than 0. In addition, the reset signal 114 may cause the frame counter 103 to be reset for every a predetermined number of frames, not at the beginning of a program. In addition, the data length of the line count value is not limited to 16 bits.

An FF circuit 104 holds data 112 supplied from the CPU+timing controller 110. The data 112 are different from a frame or a line, for example a fixed value such as version information. Instead, the data 112 may be a value updated according to a predetermined rule for example predetermined timing based on a trigger signal 113. An output of the FF circuit 104 is for example 72-bit data. The output of the FF circuit 104 can be reset at predetermined timing with a reset signal 111. The data length of the output of the FF circuit 104 is not limited to 72 bits.

Data held in the FF circuit 104, the frame counter 103, the line counter 102, and the FF circuit 101 are read in parallel by the AES encryption device 105 at clock timing thereof. In other words, in the example shown in FIG. 10, 72-bit data held in the FF circuit 104, 24-bit data held in the frame counter 103, 16-bit data held in the line counter 102, and 16-bit data held in the FF circuit 101, namely a total of 128-bit data, are input to the AES encryption device 105 at clock timing thereof.

On the other hand, a 128-bit key (K) is supplied from the CPU+timing controller 110 to the AES encryption device 105. The AES encryption device 105 encrypts the 128-bit data that are input from the FF circuit 104, the frame counter 103, the line counter 102, and the FF circuit 101 with the key (K). Predetermined 120 bits of the 128-bit encrypted data are supplied to the P/P shift register 106.

The P/P shift register 106 divides the 120-bit encrypted data into 20 bits according to the data width of the input video data. Thus, the frequency of the clock that operates the AES encryption device 105 is ⅙ the frequency of the clock that synchronizes with picture data. 20-bit data that are output from the P/P shift register 106 are supplied to the EXOR circuit 100. The EXOR circuit 100 exclusively ORes the input video data and the output of the P/P shift register 106 to encrypt the input video data and output the encrypted video data.

Thus, since the encryption circuit 31 according to the present invention feeds back encrypted data to the input of the AES encryption device 105, even if a stealer tries to steal encrypted picture data and restore original picture data in the data steal method of the related art described in. FIG. 7, he or she cannot restore the original picture data at all. This is because as a characteristic of the CFB mode, since a pseudo random sequence generated by an encryption device is affected by an input data sequence, the pseudo random sequence obtained in the steal method of the related art is completely different from the pseudo random sequence generated by the AES encryption device 105 of the encryption circuit 31.

In addition, when encrypted data are fed back to the input of the AES encryption device 105, since the FF circuit 104 that holds the encrypted data that are fed back is reset for each line, the system is not affected by feedback of encrypted data of the preceding line. Thus, if an undesirable event such as out-of-synchronization or missing of a pixel takes place in the preceding line, encrypted data of the current line cannot be decrypted according to the CFB mode. However, in the system according to the present invention, when the current line is updated, the system can be completely recovered from such an error.

In the foregoing embodiment, data that are input to the AES encryption device 105 are the outputs of the FF circuit 104, the frame counter 103, the line counter 102, and the FF circuit 101. However, the present invention is not limited to this example. For example, the FF circuit 104 does not need to output a fixed value. In addition, a counter whose update and reset periods are different from those of the frame counter 103 and the line counter 102 may be added. Instead, the frame counter 103 may be omitted. In the foregoing example, 72 bits, 24 bits, 16 bits, and 16 bits of the output data are distributed to the FF circuit 104, the frame counter 103, the line counter 102, and the FF circuit 101, respectively. However, these values are just examples. Thus, other values may be distributed to these circuits. In addition, the bit width of input video data is not limited to 20 bits. In addition, the video signal format is not limited to the format having luminance Y and color difference C.

The relationships of the claims and this embodiment are as follows. In claim 1, hold means corresponds to for example the FF circuit 101. One or a plurality of counters correspond to for example the frame counter 103 and the line counter 102. Encryption means corresponds to for example the AES encryption device 105. Calculation means corresponds to for example the EXOR circuit 100. A path that inputs a part or all encrypted data that are output from the calculation means corresponds to the path that supplies the output of the EXOR circuit 100 to the FF circuit 101. Signal generation means corresponds to for example the CPU+timing controller 110. These relationships are just examples. Thus, the present invention is not limited to these examples.

Figure 11:
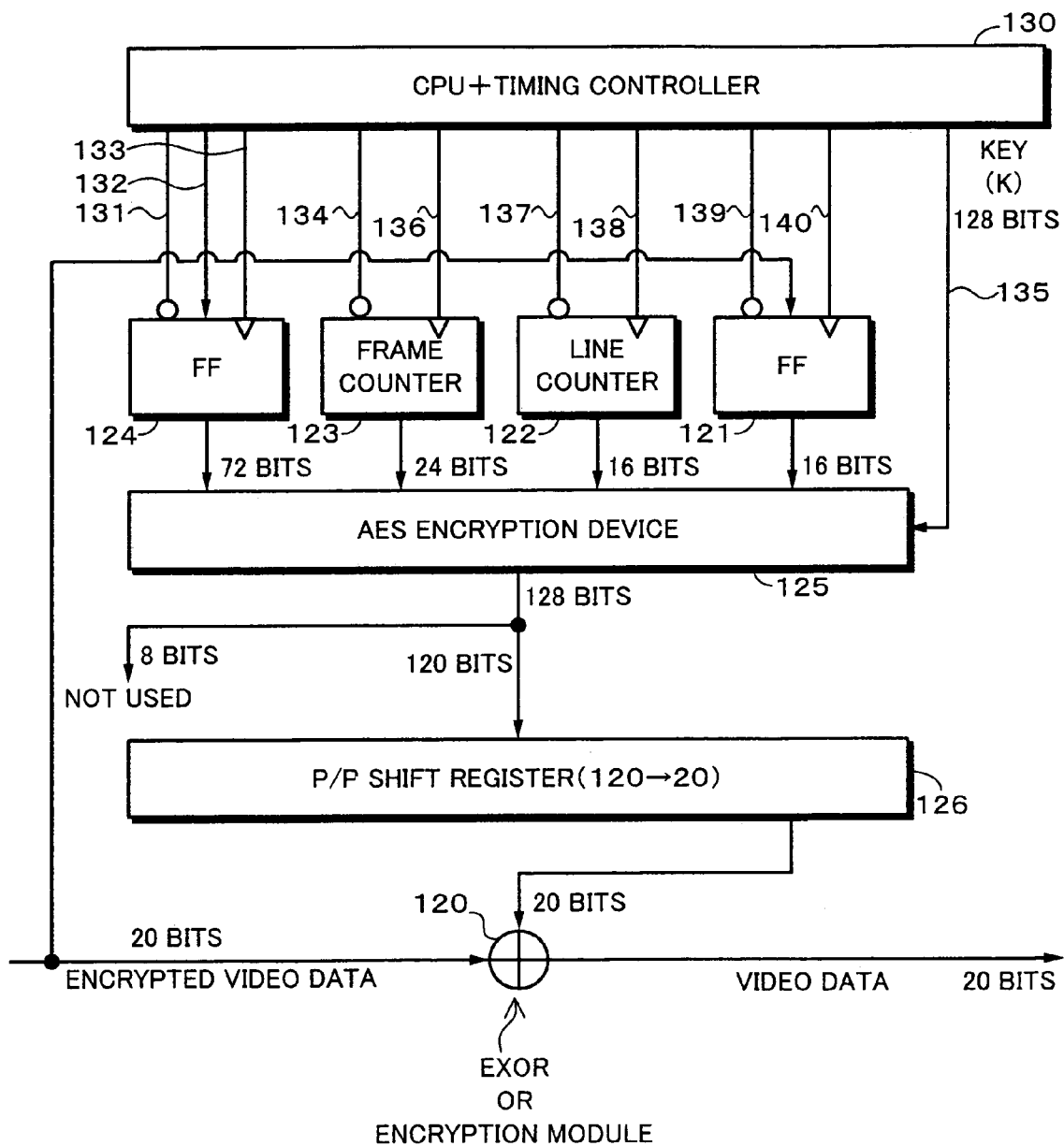
FIG. 11 is a block diagram showing an example of the structure of a decryption circuit, which corresponds to the encryption circuit, according to an embodiment of the present invention.

FIG. 11 shows an example of the structure of a decryption circuit 150, which corresponds to the encryption circuit 31 shown in FIG. 10. The decryption circuit 150 is disposed in the HD-SDI decryption device 14. The decryption circuit 150 decrypts encrypted video data transmitted from the HD-SDI encryption device 12 through the coaxial cable 13. The decryption circuit 150 can be accomplished by the same structure as the encryption circuit 31 except for an input path of encrypted video data that are input to the FF circuit 101 of the encryption circuit 31. Various types of timings and the bit width of data of the decryption circuit 150 are the same as those of the encryption circuit 31.

In the decryption circuit 150, an AES encryption device 125 is the same as the AES encryption device 105 used in the encryption circuit 31. The AES encryption device 125 encrypts input data with a 128-bit key (K) in common with the key of the encryption circuit 31 according to the AES. In addition, a CPU+timing controller 130 is composed of a CPU and a timing controller. The timing controller can output various signals at timing of each clock and each frame and each line of video data.

Encrypted video data having a data width of 20 bits for each pixel are input to the decryption circuit 150 for each clock. The encrypted video data are supplied to an EXOR circuit 120. The EXOR circuit 120 exclusively ORes the encrypted video data and an output of a P/P shift register 126, decrypts the encrypted video data, restores original data, and outputs the restored video data.

The encrypted video data are supplied to the EXOR circuit 120. In addition, 16 bits of the 20-bit encrypted video data are supplied to an FF circuit 121, which corresponds to the FF circuit 101. The FF circuit 121 holds the 16 bits of the encrypted video data. Of course, when the FF circuit 101 uses all 20 bits of the input video data, all 20 bits of the encrypted video data are input to the FF circuit 121. The hold value of the FF circuit 121 is updated with a clock 140 that is the same as a clock of the AES encryption device 125. In addition, a reset signal 139 is supplied from the CPU+timing controller 130 to the FF circuit 121 so that it is reset a predetermined number of times for each line of video data that is updated. Timing of the reset signal 139 corresponds to AES latency of which for example a reset value of the AES encryption device 125 affects the output thereof.

A line counter 122 is a counter that is updated corresponding to the line counter 102. For example, the line counter 122 counts up by 1 and updates the count value for each line of encrypted video data with a trigger signal 138 supplied from the CPU+timing controller 130 for each line of the encrypted video data. A reset signal 137 is supplied from the CPU+ timing controller 130 to the line counter 122 so that it is updated for each frame that is updated. The line count value is for example 16-bit data.

A frame counter 123 is a counter that is updated corresponding to the frame counter 103. The frame counter 123 counts up by for example 1 and updates the count value for each frame of encrypted video data with a trigger signal 136 supplied from the CPU+timing controller 130 for each frame of encrypted video data. A reset signal 134 is supplied from the CPU+timing controller 130 to the frame counter 123 so that it is reset for example one time at startup of a program of the encrypted video data. The frame count value is for example 24-bit data.

An FF circuit 124 holds data 132 supplied from the CPU+ timing controller 130. The data 132 are different from a frame or a line, for example a fixed value such as version information. Instead, the data 132 may be a value updated according to a predetermined rule for example predetermined timing based on a trigger signal 133. The data 132 are for example a value corresponding to the data 112. As described above, when the data 112 are a value that is updated at predetermined timing based on the trigger signal 113, the data 132 may be a value updated at predetermined timing based on for example the trigger signal 133 corresponding to the trigger 113. An output of the FF circuit 124 is for example 72-bit data. The output of the FF circuit 124 can be reset with a reset signal 131 at timing corresponding to the reset signal 111.

Data held in the FF circuit 124, the frame counter 123, the line counter 122, and the FF circuit 121 are read in parallel by an AES encryption device 125 at clock timing thereof. In other words, in the example shown in FIG. 11, 72-bit data held in the FF circuit 124, 24-bit data held in the frame counter 123, 16-bit data held in the line counter 122, and 16-bit data held in the FF circuit 121, a total of 128-bit data, are input to the AES encryption device 125 at clock timing thereof.

On the other hand, a 128-bit key (K) is supplied from the CPU+timing controller 130 to the AES encryption device 125. The key (K) is in common with the key (K) used in the encryption circuit 31. The AES encryption device 125 encrypts 128-bit data that are input from the FF circuit 124, the frame counter 123, the line counter 122, and the FF circuit 121 with the key (K). Predetermined 120 bits of the 128-bit encrypted data are supplied to the P/P shift register 126.

The P/P shift register 126 divides the 120-bit encrypted data into 20 bits according to the data width of the input encrypted video data. Thus, the frequency of the clock that operates the AES encryption device 125 is ⅙ the frequency of the clock that synchronizes with picture data. The 20-bit data that are output from the P/P shift register 126 are supplied to the EXOR circuit 120. The EXOR circuit 120 exclusively ORes the input encrypted video data and the output of the P/P shift register 126, decrypts the input encrypted video data, and outputs the decrypted video data.

As described above, the decryption circuit 150 corresponds to the encryption circuit 31. Thus, the structures and operations of the FF circuit 124, the frame counter 123, the line counter 122, and the FF circuit 121 that input data to the AES encryption device 125 correspond to those of the FF circuit 104, the frame counter 103, the line counter 102, and the FF circuit 101 of the encryption circuit 31.

The relationships of the claims and this embodiment are as follows. In claim 10, hold means corresponds to for example the FF circuit 121. One or a plurality of counters correspond to for example the frame counter 123 and the line counter 122. Encryption means corresponds to for example the AES encryption device 125. Calculation means corresponds to for example the EXOR circuit 120. A path that inputs a part or all encrypted data that are input from the outside to the hold means corresponds to the path through which for example encrypted video data are input to the EXOR circuit 120 and the FF circuit 121. Signal generation means corresponds to for example the CPU+timing controller 130. These relationships are just examples. Thus, the present invention is not limited to these examples.

In the foregoing embodiment, to calculate the input video data and the output of the P/P shift register 106 and obtain encrypted video data the EXOR circuit 100 is used. However, the present invention is not limited to this example.

In the foregoing embodiment, video data and encrypted video data are transmitted according to the HD-SDI standard. However, the present invention is not limited to this example. In other words, the present invention can be applied to other transmission systems.

DESCRIPTION OF REFERENCE NUMERALS

10 VIDEO DECODER
12 HD-SDI ENCRYPTION DEVICE
13 COAXIAL CABLE
14 HD-SDI DECRYPTION DEVICE
16 PROJECTOR
20 HD-SDI SERIAL/PARALLEL CONVERSION CIRCUIT BLOCK
26 DEMULTIPLEXER
30 ENCRYPTION CIRCUIT BLOCK
31 ENCRYPTION CIRCUIT
32 CPU
40 HD-SDI PARALLEL/SERIAL CONVERSION CIRCUIT BLOCK
41 MULTI PLEXER/FORMATTER
50 DECRYPTION CIRCUIT
100 EXOR CIRCUIT
101 FF CIRCUIT
102 LINE COUNTER
103 FRAME COUNTER
104 FF CIRCUIT
105 AES ENCRYPTION DEVICE
106 P/P SHIFT REGISTER
110 CPU+TIMING CONTROLLER

The invention claimed is:

1. An encryption apparatus, comprising:
   hold means for holding a part or all input data with a trigger signal and resetting held data with a reset signal;
   one or a plurality of counters that count up or count down count values with the trigger signal and reset the count values to predetermined values with the reset signal;
   encryption means for reading the data held by the hold means and one or a plurality of the count values and for encrypting the data held by the hold means and one or a plurality of the count values of the one or plurality of counters;
   calculation means for calculating the output of the encryption means and input data that are input from the outside according to a first predetermined rule, encrypting the input data, and outputting the encrypted data;
   a path that inputs a part or all the encrypted data that are output from the calculation means to the hold means; and
   signal generation means for generating the trigger signal and the reset signal supplied to the hold means and the one or plurality of counters according to a second predetermined rule and/or at predetermined timing,
   wherein the encryption means reads in parallel the data held by the hold means, one or a plurality of the count values, and a key outputted by the signal generation means, and
   wherein the input data is sequentially inputted to the calculation means in a predetermined unit, and the data held by the hold means is reset in each predetermined unit so that data in a preceding unit of the input data is excluded from affecting encryption of a current unit of the input data.

2. The encryption apparatus as set forth in claim 1,
   wherein a fixed value is input to the encryption means, and
   wherein the encryption means encrypts the fixed value, the data held by the hold means, and the one or plurality of count values.

3. The encryption apparatus as set forth in claim 1,
   wherein the reset signal that resets the data held by the hold means is supplied to the hold means at timing in synchronization with the reset signal supplied to at least one of the one or plurality of counters.

4. The encryption apparatus as set forth in claim 1,
   wherein the input data are picture data, and
   wherein the reset signal that resets the hold means is in synchronization with the picture data.

5. The encryption apparatus as set forth in claim 4,
   wherein the reset signal that resets the hold means is in synchronization with each line of the picture data.

6. The encryption apparatus as set forth in claim 1,
   wherein the input data are picture data, and
   wherein the reset signal that resets at least one of the one or plurality of counters is in synchronization with the picture data.

7. The encryption apparatus as set forth in claim 6,
   wherein the reset signal that resets at least one of the one or plurality of counters is in synchronization with each frame of the picture data.

8. The encryption apparatus as set forth in claim 6,
   wherein the reset signal that resets at least one of the one or plurality of counters is in synchronization with each line of the picture data.

9. An encryption method, comprising the steps of:
   holding a part or all input data with a trigger signal and resetting held data with a reset signal;
   counting up or down count values with the trigger signal and resetting the count values to predetermined values with the reset signal;
   reading the data held by the hold step and one or a plurality of the count values;
   encrypting the data held at the hold step and one or a plurality of the count values at the count step;
   calculating the output at the encryption step and input data that are input from the outside according to a first predetermined rule, encrypting the input data, and outputting the encrypted data;
   inputting a part or all the encrypted data that are output at the calculation step to the hold step; and generating the trigger signal and the reset signal supplied to the hold step and the count step according to a second predetermined rule and/or at predetermined timing, wherein the encrypting step reads in parallel the data held by the holding step, one or a plurality of the count values, and a key outputted by the generating step, and wherein the input data is sequentially inputted to the calculating step in a predetermined unit, and the data held by the holding step is reset in each predetermined unit so that data in a preceding unit of the input data is excluded from affecting encryption of a current unit of the input data.

10. A record medium storing an executable program that, when executed, causes a computer to encrypt data, the program comprising the steps of:

holding a part or all input data with a trigger signal and resetting held data with a reset signal;

counting up or down count values with the trigger signal and resetting the count values to predetermined values with the reset signal;

reading the data held by the hold step and one or a plurality of the count values;

encrypting the data held at the hold step and one or a plurality of the count values at the count step;

calculating the output at the encryption step and input data that are input from the outside according to a first predetermined rule, encrypting the input data, and outputting the encrypted data;

inputting a part or all the encrypted data that are output at the calculation step to the hold step; and generating the trigger signal and the reset signal supplied to the hold step and the count step according to a second predetermined rule and/or at predetermined timing, wherein the encrypting step reads in parallel the data held by the holding step, one or a plurality of the count values, and a key outputted by the generating step, and wherein the input data is sequentially inputted to the calculating step in a predetermined unit, and the data held by the holding step is reset in each predetermined unit so that data in a preceding unit of the input data is excluded from affecting encryption of a current unit of the input data.

11. A decryption apparatus that decrypts encrypted data encrypted by an encryption apparatus, the decryption apparatus comprising:

hold means for holding a part or all input data with a trigger signal and resetting held data with a reset signal;

one or a plurality of counters that count up or count down count values with the trigger signal and reset the count values to predetermined values with the reset signal;

encryption means for reading the data held by the hold means and one or a plurality of the count values and for encrypting the data held by the hold means and one or a plurality of the count values of the one or plurality of counters;

calculation means for calculating the output of the encryption means and input data that are input from the outside according to a first predetermined rule, encrypting the input data, and outputting the encrypted data;

a path that inputs a part or all the encrypted data that are input from the outside to the hold means; and signal generation means for generating the trigger signal and the reset signal supplied to the hold means and the one or plurality of counters according to a second predetermined rule and/or at predetermined timing, wherein the encryption means reads in parallel the data held by the hold means, one or a plurality of the count values, and a key outputted by the signal generation means, and wherein the input data is sequentially inputted to the calculation means in a predetermined unit, and the data held by the hold means is reset in each predetermined unit so that data in a preceding unit of the input data is excluded from affecting encryption of a current unit of the input data.

12. The decryption apparatus as set forth in claim 11, wherein a fixed value is input to the encryption means, and wherein the encryption means encrypts the fixed value, the data held by the hold means, and the one or plurality of count values.

13. The decryption apparatus as set forth in claim 11, wherein the reset signal that resets the data held by the hold means is supplied to the hold means at timing in synchronization with the reset signal supplied to at least one of the one or plurality of counters.

14. The decryption apparatus as set forth in claim 11, wherein the encrypted data are encrypted picture data, and wherein the reset signal that resets the hold means is in synchronization with the picture data.

15. The decryption apparatus as set forth in claim 14, wherein the reset signal that resets the hold means is in synchronization with each line of the picture data.

16. The decryption apparatus as set forth in claim 11, wherein the encrypted data are encrypted picture data, and wherein the reset signal that resets at least one of the one or plurality of counters is in synchronization with the picture data.

17. The decryption apparatus as set forth in claim 16, wherein the reset signal that resets at least one of the one or plurality of counters is in synchronization with each frame of the picture data.

18. The decryption apparatus as set forth in claim 16, wherein the reset signal that resets at least one of the one or plurality of counters is in synchronization with each line of the picture data.

19. A decryption method of decrypting encrypted data encrypted in an encryption method, the decryption method comprising the steps of:

holding a part or all input data with a trigger signal and resetting held data with a reset signal;

counting up or down the count values with the trigger signal and resetting count values to predetermined values with the reset signal;

reading the data held by the hold step and one or a plurality of the count values;

encrypting the data held at the hold step and one or a plurality of the count values at the count step;

calculating the output at the encryption step and input data that are input from the outside according to a first predetermined rule, encrypting the input data, and outputting the encrypted data;

inputting a part or all the encrypted data that are input from the outside to the hold step; and generating the trigger signal and the reset signal supplied to the hold step and the count step according to a second predetermined rule and/or at predetermined timing, wherein the encrypting step reads in parallel the data held by the holding step, one or a plurality of the count values, and a key outputted by the generating step, and wherein the input data is sequentially inputted to the calculating step in a predetermined unit, and the data held by the holding step is reset in each predetermined unit so that data in a preceding unit of the input data is excluded from affecting encryption of a current unit of the input data.

20. A record medium storing an executable program that, when executed, causes a computer to decrypt data, the program comprising the steps of:

holding a part or all input data with a trigger signal and resetting held data with a reset signal;

counting up or down the count values with the trigger signal and resetting count values to predetermined values with the reset signal;

reading the data held by the hold means and one or a plurality of the count values;

encrypting the data held at the hold step and one or a plurality of the count values at the count step;

calculating the output at the encryption step and input data that are input from the outside according to a first predetermined rule, encrypting the input data, and outputting the encrypted data;

inputting a part or all the encrypted data that are input from the outside to the hold step; and generating the trigger signal and the reset signal supplied to the hold step and the count step according to a second predetermined rule and/or at predetermined timing, wherein the encrypting step reads in parallel the data held by the holding step, one or a plurality of the count values, and a key outputted by the generating step, and wherein the input data is sequentially inputted to the calculating step in a predetermined unit, and the data held by the holding step is reset in each predetermined unit so that data in a preceding unit of the input data is excluded from affecting encryption of a current unit of the input data.

* * * * *